United States Patent
Huth et al.

(10) Patent No.: US 10,978,967 B2
(45) Date of Patent: Apr. 13, 2021

(54) PM LINE-START MOTOR AND SWITCH-ON METHOD THEREFOR

(71) Applicant: KSB SE & Co. KGaA, Frankenthal (DE)

(72) Inventors: Gerhard Huth, Hohenroth Leutershausen (DE); Hans-Georg Schirmer, Offenheim (DE)

(73) Assignee: KSB SE & Co. KGaA, Frankenthal (DE)

( * ) Notice: Subject to any disclaimer, the term of this patent is extended or adjusted under 35 U.S.C. 154(b) by 397 days.

(21) Appl. No.: 16/065,004

(22) PCT Filed: Nov. 22, 2016

(86) PCT No.: PCT/EP2016/078402
§ 371 (c)(1),
(2) Date: Jun. 21, 2018

(87) PCT Pub. No.: WO2017/108301
PCT Pub. Date: Jun. 29, 2017

(65) Prior Publication Data
US 2020/0287481 A1 Sep. 10, 2020

(30) Foreign Application Priority Data
Dec. 21, 2015 (DE) ...................... 10 2015 226 210.3

(51) Int. Cl.
*H02P 1/48* (2006.01)
(52) U.S. Cl.
CPC ...................................... *H02P 1/48* (2013.01)

(58) Field of Classification Search
None
See application file for complete search history.

(56) References Cited

U.S. PATENT DOCUMENTS

| 5,049,800 A | 9/1991 | Kohari et al. |
| 5,677,580 A * | 10/1997 | Huang ................ H02K 21/227 310/44 |
| 5,859,513 A * | 1/1999 | Stephens .................. H02P 1/50 318/430 |
| 6,456,033 B1 | 9/2002 | Nishimura |

(Continued)

FOREIGN PATENT DOCUMENTS

| CH | 435 435 A | 5/1967 |
| JP | 58-39276 A | 3/1983 |

(Continued)

OTHER PUBLICATIONS

IET Electric Power Application (Year: 2011).*

(Continued)

*Primary Examiner* — Bentsu Ro
(74) *Attorney, Agent, or Firm* — Crowell & Moring LLP

(57) ABSTRACT

A PM line-start motor, preferably motors having a power of at least 5 kW, and a switch-on method therefor are provided. The motor includes a rotor and a stator having a stator winding designed as a pole-reversible rotary field winding. With the aid of the pole-reversible rotary field winding, the regenerative braking torque generated during the asynchronous high-run operation can be avoided, preferably by use of a sequence controller to control the changeover of the pole-reversible rotary field winding in the run-up phase.

13 Claims, 5 Drawing Sheets

(56) References Cited

U.S. PATENT DOCUMENTS

| | | | |
|---|---|---|---|
| 2001/0003412 A1* | 6/2001 | Schmider | H02P 6/22 318/400.11 |
| 2007/0186582 A1 | 8/2007 | Guillard | |
| 2009/0127961 A1 | 5/2009 | Pedersen et al. | |
| 2017/0063176 A1* | 3/2017 | Li | H02K 1/143 |
| 2017/0077791 A1* | 3/2017 | Li | H02K 1/148 |

FOREIGN PATENT DOCUMENTS

| | | |
|---|---|---|
| JP | 1-214293 A | 8/1989 |
| JP | 2001-327132 A | 11/2001 |
| JP | 2006-271071 A | 10/2006 |
| JP | 2007-515617 A | 6/2007 |
| JP | 2008-520175 A | 6/2008 |
| JP | 2012-522485 A | 9/2012 |
| WO | WO 2010/111761 A2 | 10/2010 |

OTHER PUBLICATIONS

International Search Report (PCT/ISA/210) issued in PCT Application No. PCT/EP2016/078402 dated Feb. 22, 2017 with English translation (eight (8) pages).

German-language Written Opinion (PCT/ISA/237) issued in PCT Application No. PCT/EP2016/078402 dated Feb. 22, 2017 (six (6) pages).

International Preliminary Report on Patentability (PCT/IB/338) issued in PCT Application No. PCT/EP2016/078402 dated Jun. 26, 2018, including English translation of document C2 (German-language Written Opinion (PCT/ISA/237) previously filed on Jun. 21, 2018) (six (6) pages).

Aliabad A. et al., "Line-Start Permanent-Magnet Motors: Significant Improvements in Starting Torque, Synchronization, and Steady-State Performance" IEEE Transactions on Magnetics, 2010, pp. 4066-4072, vol. 46, No. 12, XP 11336722 A (seven (7) pages).

Aliabad A. et al., "Analytic Modelling and Dynamic Analysis of Pole-Changing Line-Start Permanent-Magnet Motors", IET Electric Power Applications, 2012, pp. 149-155, vol. 6, No. 3, The Institution of Engineering and Technology, XP6041293 A (seven (7) pages).

Japanese-language Office Action issued in Japanese Application No. 2018-532250 dated Sep. 29, 2020 with English translation (15 pages).

* cited by examiner

PM LINE-START MOTOR AND SWITCH-ON METHOD THEREFOR

CROSS REFERENCE TO RELATED APPLICATIONS

This application is a continuation of PCT International Application No. PCT/EP2016/078402, filed Nov. 22, 2016, which claims priority under 35 U.S.C. § 119 from German Patent Application No. 10 2015 226 210.3, filed Dec. 21, 2015, the entire disclosures of which are herein expressly incorporated by reference.

BACKGROUND AND SUMMARY OF THE INVENTION

The present invention relates to a line-start motor with permanent magnet excitation, also referred to below as a PM line-start motor, and to a switch-on method therefor.

The permanent-magnet line-start motor, alternatively also sometimes referred to as a line-start motor with permanent magnet excitation, a line-start permanent-magnet motor or as an LSPM motor, is a three-phase asynchronous motor comprising a squirrel-cage rotor, which contains additional permanent magnets in the rotor. After the asynchronous start-up, said motor synchronizes itself with the feed frequency and then runs in synchronous operation. In principle, said motor has minimal rotor and excitation losses, which results in a high efficiency. Said motor consequently combines the advantages of the robust asynchronous machine with those of the low-loss synchronous motor.

A motor of this kind has the ability of an asynchronous motor to generate an asynchronous start-up torque and the ability of a synchronous motor to be able to run at a rotational speed synchronous with the rotating field.

PM line-start motors have to be connected to the three-phase supply system from a rated power of approximately 4 to 5 kW for the purpose of reducing the inrush surges in the supply system and shaft assembly using an appropriate switch-on method.

The switch-on methods known from the squirrel-cage motors, such as the star-delta start-up, the starting transformer or the soft starter, for example, constitute methods that initially reduce the motor voltage during switch-on. These methods cannot be used expediently in PM line-start motors. The reason for this is due to the physics of the PM line-start motor.

PM line-start motors constitute a combination of squirrel-cage motor and PM synchronous motor. After switch-on, the PM line-start motor initially runs up using the start-up cage like a squirrel-cage motor. After the run-up process, the final pull-in to the synchronous rotational speed follows and the PM line-start motor from then on runs according to operation as a PM synchronous motor at a correspondingly high efficiency.

During the asynchronous run-up process, the PM rotor induces a slip-frequency voltage system in the stator winding for which the three-phase supply system practically constitutes a short. This results, in addition to the desired asynchronous torque of the start-up cage, in an additional generator-type braking torque, which in principle prevents the run-up process. The superposition of the two torque components is sketched in FIG. 1.

The profile of the generator-type braking torque has a pronounced braking saddle. Said generator-type braking saddle, which can be structurally influenced in terms of the order of magnitude thereof only to a very limited extent and is also not dependent on the supply system voltage, constitutes the actual problem in the switch-on and run-up process with a reduced voltage.

Since the asynchronous torque drops quadratically with the reduced voltage but the generator-type braking saddle remains unchanged in terms of its level, the run-up process at a correspondingly reduced voltage can end as early as at the generator-type braking saddle. The asynchronous driving torque with reduced voltage is not great enough to overcome the generator-type braking saddle. In some circumstances, this therefore leads to a slower-than-synchronous limit cycle (fluctuation about a rotational speed point in the slower-than-synchronous rotational speed range) of the motor in the switch-on phase with reduced voltage. In practice, this phenomenon of getting stuck at the generator-type braking saddle takes place as early as from a voltage reduction to 80 to 85%. Voltage-reducing switch-on methods alone are therefore unusable for PM line-start motors. It is therefore the object to develop switch-on methods for PM line-start motors that can be used effectively and that overcome the aforementioned disadvantages.

Until now, this object did not have to be achieved since, entirely contrary to their designation as "line-start", PM line-start motors were initially developed specifically for rotational-speed-variable operation at the U-f converter. Only in recent years has the line-start functionality been rediscovered in connection with the demand for efficiency-class motors. However, until now, commercially available PM line-start motors have only covered the lower power range up to approximately 5 kW. For this power range, however, switch-on methods are not yet required, with the result that such motors are not subjected to the problem explained above.

The PM line-start motor, which preferably has a power of at least 5 kW, accordingly comprises a rotor and a stator having a stator winding, wherein the stator winding is embodied as a changeable-pole rotating field winding.

This can prevent the generator-type braking saddle that obstructs the run-up of the motor in a switch-on method.

The changeable-pole rotating field winding preferably comprises a first winding stage and a second winding stage, which can be operated separately from one another, wherein the first winding stage has a number of pole pairs, referred to below as number of start-up pole pairs $p1$, which is not equal to a number of pole pairs, referred to below as number of operating pole pairs $p2$, of the second winding stage.

Typically, the first winding stage serves for the asynchronous run-up of the motor and the second winding stage serves for the synchronous operation of the motor. It is advantageous here when the first winding stage is sized so that a generator-type braking saddle cannot form.

The suppression of the generator-type braking saddle in the start-up phase is possible when the first winding stage, which is used for the asynchronous run-up of the motor, has a number of start-up pole pairs $p1$ that does not correspond to the number of pole pairs $p3$ of the PM rotor. In the start-up phase, the stator winding and the start-up cage with the number of start-up pole pairs $p1$ therefore operate as a pure asynchronous motor. The PM rotor is decoupled on account of the different numbers of pole pairs. This decoupling prevents the formation of the generator-type braking saddle. It therefore does not result in the PM rotor generating a braking torque that counteracts the start-up torque in the run-up process.

After the run-up, there is a changeover to the second winding stage, which preferably has the same number of pole pairs $p3$ of the PM rotor. In an advantageous embodiment of the invention, the number of operating pole pairs p2 of the second winding stage is therefore equal to the number of pole pairs p3 of the PM rotor. It is clear to the person skilled in the art that the second winding stage is provided for the synchronous operation of the PM line-start motor.

According to a further advantageous modification of the invention, the number of start-up pole pairs $p_1$ of the first winding stage is lower than the number of operating pole pairs $p_2$ of the second winding stage. For example, the numbers of pole pairs of the first and the second winding stage of the stator winding can thus assume the ratio 1:2. However, this does not exclude the variation of the invention that the number of start-up pole pairs of the first winding stage $p_1$ can also be greater than the number of operating pole pairs $p_2$ of the second winding.

According to a further development of the invention, the motor further comprises a sequence controller, which is designed to perform a targeted winding changeover of the changeable-pole rotating field winding during a switch-on process of the motor. Here, a targeted winding changeover preferably takes place from the first winding stage for the run-up of the motor to the second winding stage for the synchronous operation of the motor.

According to a further advantageous configuration of the invention, the sequence controller is further designed to provide a phase or a period of time between the changeover from the first winding stage to the second winding stage, in which phase or period of time neither the first nor the second winding stage is supplied with power, wherein the time of the changeover to the second winding stage preferably takes place depending on the phasing of a supply system voltage.

The changeover time has a significant influence on a restart current surge, which can arise during observation of the phasing of a supply system voltage with respect to the induced voltage (rotor voltage).

In this case, the motor according to the invention can further comprise a first switch, which is connected to the first winding stage, and a second switch, which is connected to the second winding stage, in order to selectively close or interrupt a line arranged between the respective winding stage and the supply system voltage line. Here, the first and the second switch can preferably be actuated by a sequence controller. The switches provided can be, in particular, contactors.

According to an optional development of the invention, the respective ends of the first and second switch that are not connected to the associated winding are connected to one another and connected to a supply line by means of a power switch. Here, the power switch is also preferably configured to be able to be actuated by the sequence controller.

According to one embodiment, the motor can have a ballast circuit for reducing a voltage between a supply system voltage line and the stator winding in order to limit an inrush current or a restart current, which can arise, for example, during changeover from the first winding to the second winding. Here, it is possible for the ballast circuit to be implemented by ballast impedances or a soft starter.

According to a further optional feature, the stator winding is embodied in the form of a Dahlander winding.

The implementation of the stator winding in the form of a Dahlander winding is advantageous since better use of the active parts is achieved.

However, as an alternative to the integral formation of the stator winding in the form of a Dahlander winding, the stator winding can also have two windings that are isolated from one another, which are each designed for different numbers of poles.

According to an advantageous embodiment of the invention, the motor is designed to execute a changeover from the first winding to the second winding based on the synchronous rated rotational speed $n_1$ of the PM line-start motor in oversynchronous fashion. Here, the rated rotational speed $n_1$ is the ratio of the supply system frequency $f_{supply\ system}$ to the number of operating pole pairs $p_2$ of the second winding stage.

This achieves the smallest possible restart current surge during changeover from the first winding stage to the second winding stage.

The present invention further relates to a switch-on method of a PM line-start motor, which has the features of one of the embodiments stated above, wherein the method comprises the following steps:

(i) switching on a first winding stage to start an asynchronous run-up phase, (ii) disconnecting the first winding stage in order to terminate the asynchronous run-up phase, and (iii) connecting the second winding stage, which is designed for the synchronous operation of the motor.

Between step (ii) and (iii), the above switch-on method preferably further comprises the step of:

(iv) monitoring the supply system voltage and an induced rotor voltage in order to determine a changeover time that permits the smoothest possible supply system connection, wherein a changeover time preferably permits the smoothest possible supply system connection when there is approximate frequency equality between the rotor voltage and the supply system voltage and the difference between the supply system voltage and the frequency equality is small, that is to say undershoots a predetermined threshold value.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
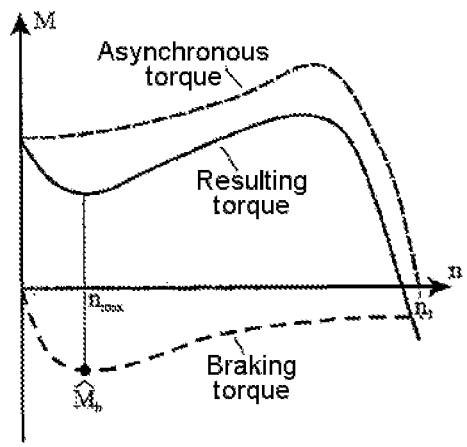
FIG. 1 shows a quasi-stationary torque profile during the asynchronous run-up of a conventional PM line-start motor.

FIG. 1 has already been explained in more detail in the introductory part of the description and shows the profile of the braking torque over the motor rotational speed. The problem is that the asynchronous torque drops quadratically with a reduction of the voltage but the braking torque caused by the PM rotor remains unchanged. If the desire now is thus to provide a switch-on method that provides a reduced voltage at the beginning, there is the risk that the braking torque is greater than the asynchronous torque and counteracts an acceleration of the rotor.

Figure 2:
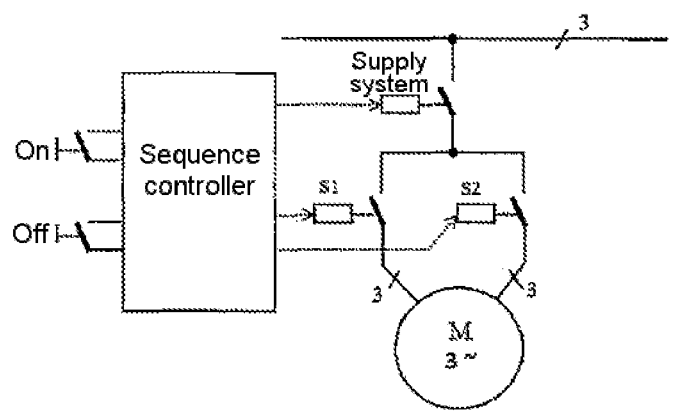
FIG. 2 shows a structural circuit diagram of a connected PM line-start motor according to an embodiment of the invention.

FIG. 2 shows the schematic circuit diagram of a PM line-start motor according to the invention with winding changeover.

A total of three switches, which are designed as contactors, in the form of semiconductor contactors and/or mechanical contactors, or as switching elements, can be seen. Switches S1 and S2 feed the motor winding in such a way that two winding stages are produced for the PM line-start motor. The third switch, denoted supply system, isolates the entire circuit from the three-phase supply system during the changeover phase and when the drive is not in operation. The first winding stage connected to the switch S1 is conceived and measured for the asynchronous run-up so that practically no generator-type braking saddle can form. After the asynchronous run-up in the first winding stage, a changeover is made to the second winding stage, which is specifically designed for the synchronous operation of the motor. In this case, all of the switches, namely S1, S2 and "supply system", are connected to a sequence controller, which controls the actuation of the individual switches.

Figure 3:
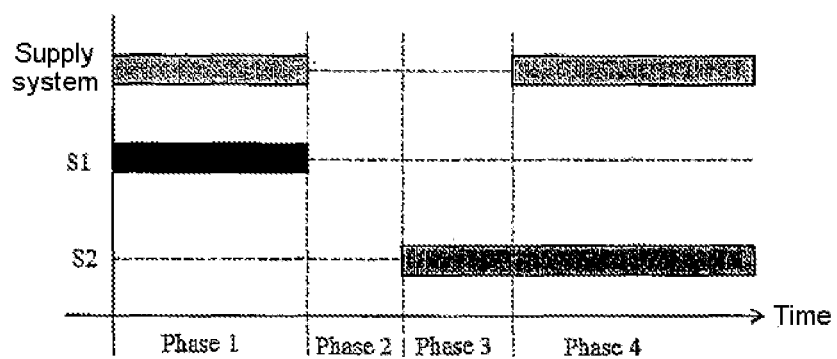
FIG. 3 shows a switching sequence of the switches depicted in FIG. 2 during run-up of the motor.

FIG. 3 shows the entire switch-on and run-up process, which is essentially divided into four switching phases. As already explained briefly above, the sequence controller, for example in the form of a programmable logic controller or a conventional relay controller, ensures the desired switching sequence of the switches. The suppression of the generator-type braking saddle, which typically forms in switching phase 1, is possible when the first winding stage of the stator winding has a different number of pole pairs to the PM rotor. In phase 2, the stator winding is taken from the supply system. In this case, the power switch or the switch S1 can be brought into its respective open position simultaneously or in succession. In phase 3, the stator winding is switched into the second winding stage using S2, but the power switch is still kept in its open position. The second winding stage now has the number of pole pairs of the PM rotor in order to execute the synchronous operation of the PM line-start motor. In order to generate the smallest possible inrush current surge, it is expedient to execute a comparison of the supply system voltage and the induced voltage in phase 3. Even if the two voltages were to have different frequencies, a transition to phase 4 in which the power switch is closed would only occur if the phasing of the two voltages were as favorable as possible with respect to one another, that is to say if the two three-phase voltage systems had the most identical phasing possible.

In phase 4, the second winding is accordingly connected to the supply system voltage by means of S2, that is to say it has thus taken over the rotor started up by the first winding.

Figure 4:
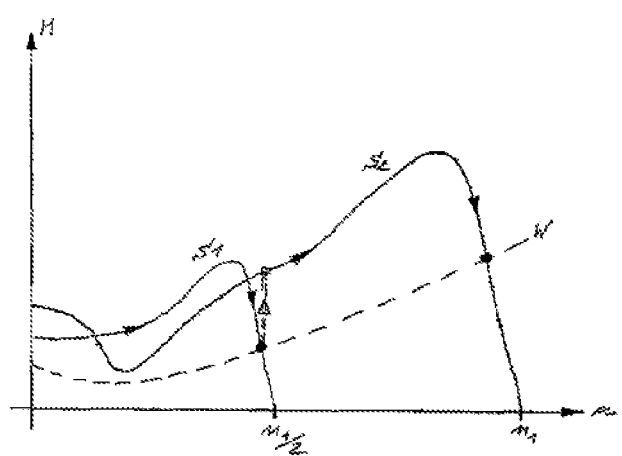
FIG. 4 shows a M(n) graph of a run-up process of a PM line-start motor according to an embodiment of the invention with winding changeover.

FIG. 4 shows this run-up process in a quasi-stationary manner in the M(n) graph illustrated for the case that the numbers of pole pairs of the two winding stages of the stator winding behave in the ratio 2:1. In this case, it also holds true that the number of start-up pole pairs $p_1$ of the first winding is double the size of the number of operating pole pairs $p_2$ of the second winding. Here, essentially two curves can be seen, which indicate the rotational speed of the motor over the abscissa and the torque arising from the motor over the ordinate. The curve denoted S1 corresponds here to the characteristic curve of the first winding stage; the curve denoted S2 corresponds to the characteristic curve of the second winding stage. The curve illustrated in dashed form and denoted W here is the load characteristic curve.

In a switch-on method of the motor according to the invention with winding changeover, the characteristic curve S1 is pursued, proceeding from the rotational speed 0, until there is a change to the characteristic curve of the second winding at the changeover process, illustrated with a double-bar line and a transparent triangle pointing upward.

The generator-type braking saddle of the characteristic curve S2 of the second winding stage, which is certainly designed for the synchronous operation of the motor, is bypassed thereby and used only in a range of the characteristic curve that no longer has a braking saddle.

The described switch-on method with winding changeover now also makes it possible to reduce the voltage in the switch-on and run-up phase without the risk of the generator-type braking saddle stalling the run-up process, in particular a run-up process with reduced voltage.

Figure 5:
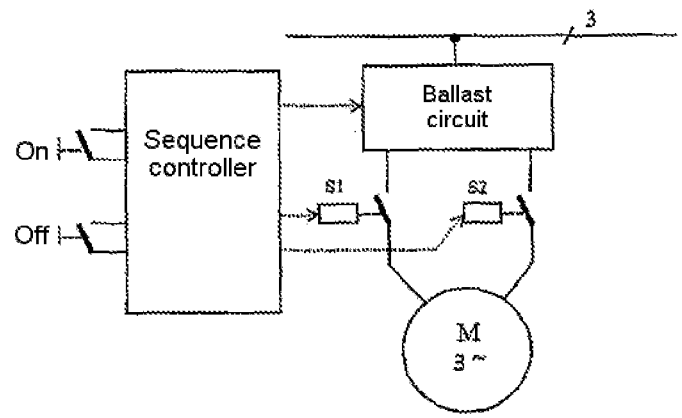
FIG. 5 shows a circuit connection variant of a PM line-start motor according to an embodiment of the invention.

FIG. 5 shows another illustration of an embodiment according to the invention, which, instead of a power switch, has a ballast circuit that can be controlled by the sequence controller. The ballast circuit is connected both to switch S1 and to switch S2. Exactly like the circuit illustrated in FIG. 2, the aim is to prevent the generator-type braking saddle arising in the run-up phase in the switch-on method. To this end, during run-up, recourse is made to the changeable stator winding. The first winding stage is switched by means of switch S1 and is conceived and measured specifically for the asynchronous run-up so that no generator-type braking saddle can form. A voltage-reducing ballast circuit can be arranged between the supply system and the stator winding for the purpose of limiting the inrush current, wherein said ballast circuit here involves, in the simplest case, ballast impedances or a soft starter.

As already explained above, after the asynchronous run-up, the first winding stage is disconnected by means of switch S1 and the second and final winding stage is switched on using switch S2. Said second winding stage is designed specifically for synchronous operation. The voltage-limiting ballast circuit between the supply system and the stator winding can also be used for the purpose of limiting the restart current when changing to the second winding stage.

The suppression of the generator-type braking saddle in the start-up phase is possible when the stator winding in the first winding stage has a number of start-up pole pairs $p_1$ that does not correspond to the number of pole pairs $p_3$ of the PM rotor. In the start-up phase, the stator winding and the start-up cage with the number of start-up pole pairs p1 thus operate as a pure asynchronous motor. The PM rotor is decoupled on account of the different numbers of pole pairs. After the run-up, there is a changeover to the second winding stage, in which the stator winding now has the number of operating pole pairs $p_2$ of the PM rotor $p_3$. The stator winding of the second winding stage accordingly has the number of pole pairs $p_2$, which is provided for the synchronous operation of the PM line-start motor. In order to prevent the generator-type braking saddle, the stator winding of the PM line-start motor is embodied as a changeable-pole rotating field winding.

In principle, an embodiment that has two isolated stator windings, which are each designed for different numbers of pole pairs, is conceivable here.

Figure 6:
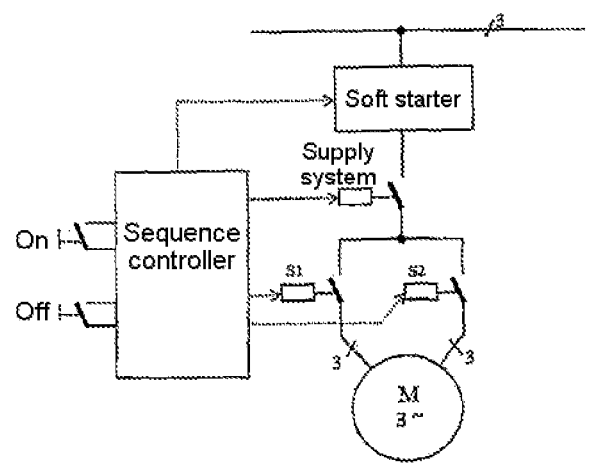
FIG. 6 shows a structural circuit diagram of a connected PM line-start motor according to an embodiment of the invention with an additional soft starter.

FIG. 6 shows a variation of the present invention with a soft starter, which reduces the motor voltage and the inrush currents and increases according to a voltage-time ramp up to the direct supply system voltage. After run-up, a soft starter of this kind is bypassed.

Figure 7:
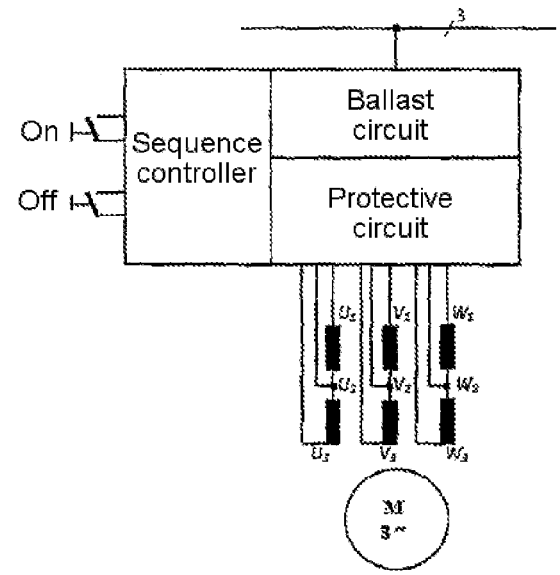
FIG. 7 shows a circuit diagram of a connected PM line-start motor, the changeable-pole stator winding of which is a Dahlander winding according to an embodiment of the invention.

FIG. 7 shows the circuit connection of a PM line-start motor according to the invention, in which the stator winding is embodied in the form of a Dahlander winding. This has the advantage that better use of the active parts is provided.

According to FIG. 7, the stator winding consists of two partial windings, the implemented winding ends $U_{1,2}$, $V_{1,2,3}$ and $W_{1,2,3}$ of which can be interconnected by means of a protective circuit to form in each case symmetrical three-phase circuits (star or delta circuits, double-star or double-delta circuits). FIG. 7 further shows a voltage-limiting ballast circuit between the supply system and the stator winding for the purpose of additionally limiting the inrush or restart current. However, said ballast circuit is optional.

In order to obtain the lowest possible restart current surge during the changeover from the first winding stage to the second winding stage, the changeover is executed in oversynchronous fashion based on the synchronous rated rotational speed $n_1 = f_{supply\ system}/p_2$ of the PM line-start motor. This variant of the switch-on method is thus possible only when the number of start-up pole pairs $p_1$ of the first winding stage is lower than the number of operating pole pairs $p_2$ of the second winding stage. This variation of the switch-on method can thus be used for PM line-start motors with numbers of pole pairs $p_2 \geq 2$.

Figure 8:
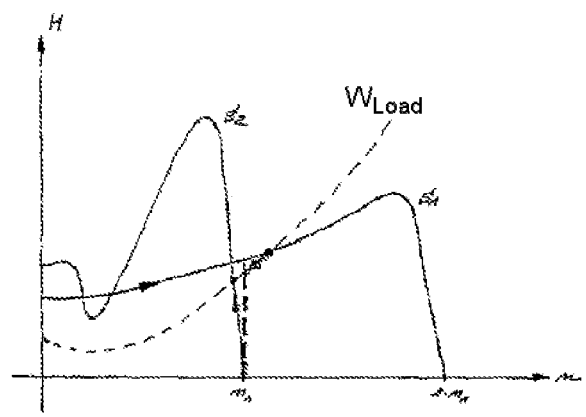
FIG. 8 shows a stationary M(n) graph of a run-up process of a PM line-start motor according to an embodiment of the invention with oversynchronous winding changeover.

FIG. 8 shows a run-up process in the stationary M(n) graph, in which the characteristic curve S1 illustrates the characteristic curve of the first winding stage, the characteristic curve S2 illustrates the characteristic curve of the second winding stage and the dashed characteristic curve illustrates the load characteristic curve.

According to FIG. 8, the stator winding is initially connected to the three-phase supply system in the first winding stage directly or by means of an optional ballast circuit. The stator winding is to be designed with respect to the first winding stage so that a stationary operating point results with the load characteristic curve above the synchronous rated rotational speed $n1 = f_{supply\ system}/p_2$. In the next step, the stator winding is disconnected from the supply system and there is an initial changeover to the second winding stage by means of the sequence controller. The stator winding now has the number of pole pairs of the PM rotor and the PM rotor induces in the stator winding a rotor voltage with the frequency $p_z \cdot n$ dependent on the present rotational speed.

Since the motor is not yet connected to the supply system, the drive is braked following the load characteristic curve. This can be recognized at the change in the operating point, which is located in the point of intersection of the characteristic curve S1 and the load characteristic curve $W_{Load}$ and moves on the load characteristic curve $W_{Load}$ in the direction of lower rotational speeds.

It is then typically the task of the sequence controller to monitor the supply system voltage and the induced rotor voltage in the interests of the smoothest possible supply system connection. When there is approximate frequency equality and the difference between the supply system voltage and the rotor voltage is as small as possible, the stator winding of the PM line-start motor is connected to the three-phase supply system in the second winding stage directly or by means of a ballast circuit. The operating point thus transitions from the characteristic curve S1 of the first winding to a range of the characteristic curve S2 of the second winding without having to pass through the generator-type braking saddle of the characteristic curve S2 in the process.

If, in FIG. 8, a centrifugal pump drive is assumed and a stator winding according to the Dahlander principle is assumed, the first winding stage can be executed in delta and the second winding stage can be executed in double star.

Figure 9:
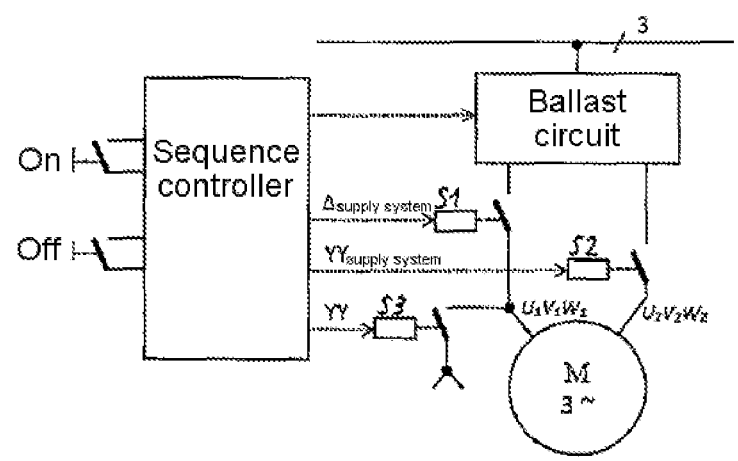
FIG. 9 shows a structural circuit diagram of a connected PM line-start motor according to an embodiment of the invention.

FIG. 9 shows the protective circuit of the main electric circuit for this purpose. Apart from a possible ballast circuit for additionally reducing the inrush current and restart current, which is optionally illustrated in FIG. 8, only three main contactors are required for the execution of this circuit variant.

The sequence controller, which can be implemented, for example, by a PLC (programmable logic controller), then ensures the necessary switching sequence of the switch-on method.

In a first step, the stator winding is switched on in the first winding stage. Should a ballast circuit be necessary to limit the inrush current, this is then subsequently disconnected.

In a second step subsequent thereto, the asynchronous run-up phase is disconnected. This is typically carried out by interrupting the power supply to the first winding stage.

In a third step, the stator winding is changed over from the first winding stage to the second winding stage. The switches or the contactors S1 and S2 are changed over accordingly for this. For the second winding stage, the electrical star point is established by the switch or the contactor S3.

The supply system voltage and the induced rotor voltage are then monitored in order to enable the smoothest possible reconnection.

The connection is then subsequently carried out at an expedient time. In this case, the second winding stage is thus connected to the supply system voltage. Should a ballast circuit be necessary to attenuate the restart current or the inrush current, said ballast circuit is disconnected in a subsequent step.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A PM line-start motor, comprising:
   a rotor; and
   a stator having a stator winding,
   wherein the stator winding is a changeable-pole rotating field winding,
   wherein
   the changeable-pole rotating field winding includes a first winding stage and a second winding stage operable separately from one another,
   a number of start-up pole pairs $p_1$ of the first winding stage differs from a number of operating pole pairs $p_2$ of the second winding stage, the first winding stage is configured for asynchronous run-up of the motor and the second winding stage is configured for synchronous operation of the motor, the number of start-up pole pairs $p_1$ of the first winding stage differs from a number of poles $p_3$ of the PM rotor, and the number of operating pole pairs $p_2$ of the second winding stage is the same as the number of poles $p_3$ of the PM rotor.

2. The motor as claimed in claim 1, wherein the number of start-up pole pairs $p_1$ of the first winding stage is lower than the number of operating pole pairs $p_2$ of the second winding stage.

3. The motor as claimed in claim 1, further comprising:
a sequence controller configured to perform a targeted winding changeover of the changeable-pole rotating field winding during a switch-on process of the motor,
wherein the targeted winding changeover is from the first winding stage for run-up of the motor to the second winding stage for synchronous operation of the motor.

4. The motor as claimed in claim 3, wherein
the sequence controller is further configured to provide a phase between the changeover from the first winding stage to the second winding stage in which neither the first nor the second winding stage is supplied with power, and
the time of the changeover to the second winding stage depends on a phasing of a supply system voltage.

5. The motor as claimed in claim 4, further comprising:
a first switch selectively connectable to the first winding stage, and
a second switch selectively connectable to the second winding stage,
wherein the first and the second switch are controlled by the sequence controller.

6. The motor as claimed in claim 5, further comprising:
a power switch controlled by the sequence controller,
wherein ends of the first and second switch remote from the windings are selectively connectable to one another and to a supply line by the power switch.

7. The motor as claimed in claim 1, wherein the first and second winding stages are isolated from one another.

8. The motor as claimed in claim 3, wherein the motor or the sequence controller is configured to execute the changeover based on the synchronous rated rotational speed $n_1$ of the PM line-start motor in an oversynchronous manner and the rated rotational speed $n_1$ is:

$n_1 = f_{supply\ system}/p_2$, wherein
$f_{supply\ system}$ is the supply system frequency, and
$p_2$ is the number of operating pole pairs of the second winding stage.

9. The motor as claimed in claim 4, wherein the stator winding is a Dahlander winding.

10. The motor as claimed in claim 5, further comprising:
a ballast circuit configured to reduce a voltage from a supply system,
wherein the ballast circuit is arranged between a voltage line of the supply system and the stator winding such that an inrush current or a restart current is limited.

11. The motor as claimed in claim 10, wherein the ballast circuit is a soft starter or includes ballast impedances.

12. A switch-on method of a PM line-start motor which includes a rotor, a stator having a stator winding which is a changeable-pole rotating field winding, a sequence controller configured to perform a targeted winding changeover of the changeable-pole rotating field winding during a switch-on process of the motor in which the first winding stage is for run-up of the motor to the second winding stage is for synchronous operation of the motor, the sequence controller further being configured to provide a phase between the changeover from the first winding stage to the second winding stage in which neither the first nor the second winding stage is supplied with power, the time of the changeover to the second winding stage depends on a phasing of a supply system voltage, comprising the steps of:
switching on the first winding stage to start an asynchronous run-up phase;
disconnecting the first winding stage to terminate the asynchronous run-up phase; and
switching on the second winding stage to start synchronous operation of the motor.

13. The switch-on method as claimed in claim 12, further comprising the step of:
between the steps of disconnecting the first winding stage and switching on the second winder stage, step (ii) and (iii), determining from a supply system voltage and an induced rotor voltage a changeover time at which the switching on of the second winding stage corresponds to when a difference between a frequency of a rotor voltage and a frequency of the supply system voltage is less than a predetermined threshold value.

* * * * *